United States Patent
Murayama et al.

(10) Patent No.: US 7,386,634 B2
(45) Date of Patent: Jun. 10, 2008

(54) CONTROL METHOD FOR BUS PROVIDED WITH INTERNAL SWITCH

(75) Inventors: Kohei Murayama, Tokyo (JP); Takafumi Fujiwara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 10/670,300

(22) Filed: Sep. 26, 2003

(65) Prior Publication Data

US 2004/0123011 A1  Jun. 24, 2004

(30) Foreign Application Priority Data

Sep. 30, 2002  (JP)  ............................. 2002-285578

(51) Int. Cl.
*G06F 3/00* (2006.01)
*G06F 13/00* (2006.01)
*G06F 1/00* (2006.01)

(52) U.S. Cl. ..................... 710/3; 710/5; 710/8; 710/38; 710/110; 713/501

(58) Field of Classification Search ................ 710/3–6, 710/57; 713/501; 382/307
See application file for complete search history.

(56) References Cited

U.S. PATENT DOCUMENTS

| | | | | |
|---|---|---|---|---|
| 4,979,100 A | * | 12/1990 | Makris et al. .............. 710/117 |
| 5,305,355 A | * | 4/1994 | Go et al. ..................... 375/356 |
| 5,713,011 A | * | 1/1998 | Satoh et al. ................. 713/501 |
| 6,091,863 A | * | 7/2000 | Nakashima et al. ........ 382/307 |
| 6,243,770 B1 | * | 6/2001 | Houg .......................... 710/57 |
| 6,247,101 B1 | * | 6/2001 | Settles ........................ 711/145 |
| 6,608,625 B1 | * | 8/2003 | Chin et al. .................. 345/501 |
| 2003/0115392 A1 | | 6/2003 | Fujiwara et al. ............ 710/113 |

FOREIGN PATENT DOCUMENTS

EP  752667 A1 *  1/1997

* cited by examiner

*Primary Examiner*—Alan S. Chen
(74) *Attorney, Agent, or Firm*—Fitzpatrick, Cella, Harper & Scinto (57) ABSTRACT

In a bus, which is provided with a switch having a plurality of master ports and a plurality of slave ports and can connect each of the plurality of master ports to an arbitrary port of the plurality of slave ports, an address phase that issues an address and a command and a data phase that issues write data are separated, and an address phase of next transaction can be issued before the data phase is completed. This improves performance of a system, in which a plurality of master modules and slave modules are connected through the bus.

7 Claims, 6 Drawing Sheets

CONTROL METHOD FOR BUS PROVIDED WITH INTERNAL SWITCH

BACKGROUND OF THE INVENTION

1. Field of the Invention

This invention relates to a bus control method for information processing apparatuses, and particularly to a control method for a bus provided with an internal switch in a controller of a complex apparatus implemented with LSI.

2. Related Background Art

Conventionally, in the case of that a controller of a complex apparatus is realized with LSI, modules, such as bus masters including various CPUs and bus slaves, exist in the system to access memory, ROM and other IO devices. Each bus master often performs access to a plurality of slaves to execute processing.

Each master module in the system, therefore, must access a plurality of slave modules. To realize this, a control method, in which a crossbar switch is used to switch connection from a master to a slave, is adopted.

Conventionally, if a master accesses a slave, a switch is connected to begin a transaction, and then the switch is released from the master after completion of one transaction.

However, if a master, i.e., CPU issues a read transaction to a slow processing device, such as an IO device, and issues a write transaction to another device, a switch is released after receiving a data return of the read transaction and then the write transaction is issued to the next device. Therefore, the master cannot issue a next transaction until access to a transaction is completed, and also the slave cannot receive the next transaction until the current transaction is completed.

SUMMARY OF THE INVENTION

The purpose of this invention is to provide a bus control method, which can improve system performance by issuing a next transaction before a transaction for a slave is completed.

According to one aspect, the present invention which achieves these objectives relates to a bus control method for a bus, which is provided with a switch having a plurality of master ports and a plurality of slave ports and can connect each of the plurality of master ports to an arbitrary port of the plurality of slave ports, comprising an address phase that issues an address and a command, and a data phase that is separated from the address phase and issues write data, wherein the address phase of a next transaction can be issued before the data phase is completed.

According to one aspect, the present invention which achieves these objectives relates to a bus, comprising a switch that can connect each of the plurality of master ports to an arbitrary port of the plurality of slave ports, wherein the address phase, which issues an address and a command, and the data phase, which issues write data, are separated, and the address phase of a next transaction can be issued before the data phase is completed.

Other objectives and advantages besides those discussed above shall be apparent to those skilled in the art from the description of a preferred embodiment of the invention that follows. In the description, reference is made to accompanying drawings, which form a part thereof, and which illustrate an example of the invention. Such example, however, is not exhaustive of the various embodiments of the invention, and therefore reference is made to the claims, which follow the description for determining the scope of the invention.

DESCRIPTION OF THE PREFERRED EMBODIMENTS

Hereinafter, referring to attached drawings, a preferred embodiment according to this invention will be explained in detail.

Figure 6:
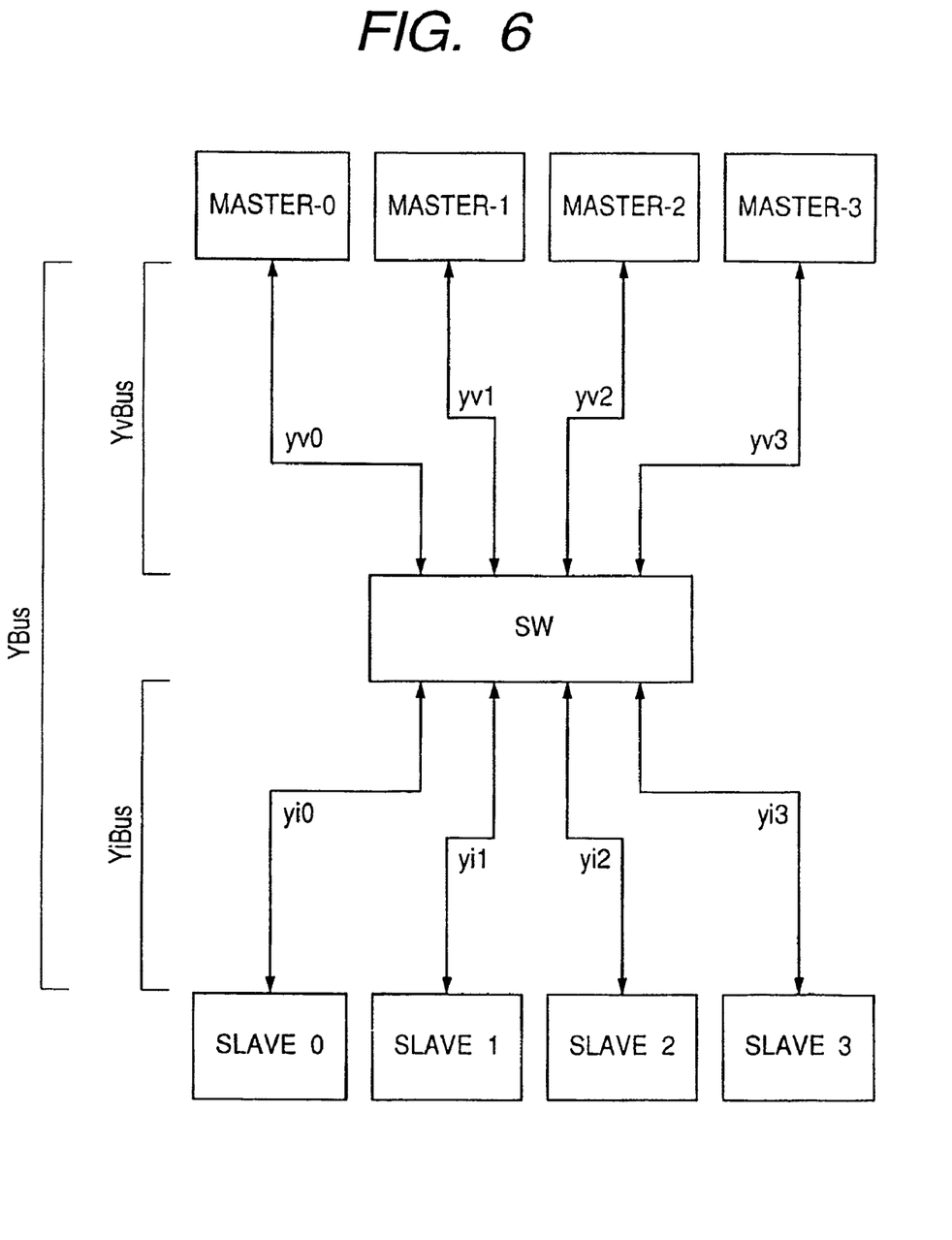
FIG. 6 is a conceptual figure to show a structure in which a plurality of masters and a plurality of slaves are connected to a bus through a switch.

FIG. 6 shows a system structure of this embodiment. A plurality of master modules (Master-0 to 3) and a plurality of slave modules (Slave-0 to 3) are connected through Ybus.

The Ybus is comprised of bus YvBus (yv0 to 3), bus YiBus (yi0 to 3) and a switch SW. The plurality of master modules (Master-0 to 3) are connected to a plurality of master ports of the switch SW via the bus YvBus (yv0 to 3), and the plurality of slave modules (Slave-0 to 3) are connected to a plurality of slave ports of the switch SW via the bus YiBus (yi0 to 3).

The bus Ybus is comprised of the following signals. As signals from the master modules to the slave modules, a transaction beginning signal y_tsp, an address signal y_addrp [31:4], a master ID signal y_midp [4:0], a read write command specification signal y_rd_no_wr, a command data specification signal y_inst_not_data, an access length specification signal y_one_not_two, a read byte enable signal y_rd_byteenp [15:0], a lock specification signal y_lockp, a write data signal y_wr_datap [127:0], a write byte enable signal y_wr_byteenp [15:0], and a snoop mask signal y_snnop_maskp are provided. As signals from the slave modules to the master modules, a slave ready signal y_srdyp, a return start signal y_rsp, a return master ID signal y_rmidp [3:0], a read data signal y_rd_datap [127:0], and a read error signal y_rd_errorp are provided.

In the Ybus, an address phase and a data phase are separated, and they can be overlapped. Hereinafter, each signal function and bus protocols will be explained.

Transaction beginning signal y_tsp: A master module issues this signal when beginning a transaction. The master module must continue to issue until the slave ready signal y_srdyp is issued. At the timing when y_srdyp is issued, the transaction of the master module is issued, and then the issue of this signal is canceled. The number of this signal in the slave side is one, and the signal means a transaction for a slave module of the receiver when the signal is issued. This signal in the master module side is prepared by the number of slave modules, and appropriate signals must be issued corresponding to slave modules to be accessed. This signal is used as a switch request signal for the switch besides a beginning signal of transaction.

Address signal y_addrp [31:4]: This signal shows an access address. At the timing when y_tsp is issued, an access address is confirmed and this signal must be maintained during one cycle after y_tsp is canceled.

Master ID signal y_midp [3:0]: This signal shows master ID, the master of which performs access. The master modules are assigned with master ID to identify each master, and master ID, which is assigned to a master that performs access, is issued. At the timing when y_tsp is issued, an access address is confirmed and this signal must be maintained during one cycle after y_tsp is canceled.

Read write command specification signal y_rd_not_wr: This signal shows types of read and write for transactions to be issued. At the timing when y_tsp is issued, an access address is confirmed and this signal must be maintained during one cycle after y_tsp is canceled. Read access is performed when this signal is "1" and write access is performed when this signal is "0."

Command data specification signal y_inst_not_data: This signal shows whether a transaction to be issued is fetch of a command or data access. At the timing when y_tsp is issued, an access address is confirmed and this signal must be maintained during one cycle after y_tsp is canceled. Command fetch is performed when this signal is "1" and data access is performed when this signal is "0."

Access length specification signal y_one_not_two: This signal shows the number of valid beats of access data. The number of access beats at YBus is fixed to two beats of 128 bits, and this signal shows the number of valid beats for the number of access beats. At the timing when y_tsp is issued, an access address is confirmed and this signal must be maintained during one cycle after y_tsp is canceled. Only the first beat is valid when this signal is "1" and two beats are valid when this signal is "0."

Read byte enable signal y_rd_byteenp [15:0]: This signal shows valid byte lane in 128 bits when read is performed. This signal specifies which byte lane is accessed to read in 128 bits when y_one_not_two shows that one beat is valid. At the timing when y_tsp is issued, an access address is confirmed and this signal must be maintained during one cycle after y_tsp is canceled. It is valid when this signal is "1" and it is invalid when this signal is "0." This signal must be valid for all byte lanes if y_one_not_two specifies two-beat access.

Lock specification signal y_lockp: This signal shows lock transaction. If a master module continuously performs transactions, this signal is issued. Connection of the switch is not released while this signal is issued. This signal is issued at the first transaction to access, and must be continuously issued until y_tsp of the last transaction is issued. Lock is issued when this signal is "1."

Write data signal y_wr_datap [127:0]: This signal shows write data, and issues 128-bit data in two-beat continuation on a bus from the following cycle after y_tsp is issued. If y_one_not_two is issued, only one beat is valid.

Write byte enable signal y_wr_byteenp [15:0]: This signal shows a valid write byte lane in 128 bits when write is performed. When y_one_not_two shows one-beat valid, this signal specifies for which byte lane in 128 bits write access is valid. This signal shows valid bits of write data at the same cycle as y_wr_datap.

Snoop mask signal y_snoop_mask: This signal shows that snoop must not be performed when accessed by a master. By issuing this signal, a transaction to be issued is not a target of snoop. Snoop is not performed when this signal is "1."

Slave ready signal y_srdyp: This signal shows that the slave side is ready to receive a transaction from a master module. While this signal is issued, a master can issue y_tsp to issue a transaction and the slave side must receive the transaction from the master. Although the number of this signal in the salve side is one, this signal is inputted to the master side by the number of slaves to which the master issues the transaction. The slave side is ready to receive a transaction if this signal is "1."

Return start signal y_rsp: This signal shows beginning of read return transaction from a slave. When the slave side is ready to read return, it issues this signal to begin read return transaction. The slave side can issue this signal at any time, and a module, which issues a read request, must receive read return transaction. The issue period of this signal is one cycle. This signal is issued if its value is "1."

Return master ID signal y_rmidp: This signal shows master ID of read return transaction. In the case of read transaction, the slave side keeps y_rmidp from a master and returns the same ID when read return transaction is performed. A master module, which issues a read request, decodes this signal, and receives read return transaction if return master ID is its master ID. This signal is confirmed at the same time as issue of y_rsp, and must be maintained during one cycle after y_rsp is canceled.

Read data signal y_rd_datap [127:0]: This signal shows read data. In the case of read access, in which one beat is showed with y_one-not-two that issues 128-bit data by two beats from next cycle after y_rsp is issued, only the first beat is valid.

Read error signal y_rd_errorp: This signal shows error of read access. At the same timing as y_rsp, this signal is issued during one cycle. Error is shown when this signal is "1."

Hereinafter, bus arbitration will be explained.

Bus arbitration is performed by an arbiter provided in the switch. Transaction is begun by y_tsp issued by a master. After issuing y_tsp, the master performs a switch request, and then y_srdyp corresponding to a slave, which receives access for the request, is issued.

The signal y_srdyp shows a state in which a slave that receives access can receive a transaction, and is issued when the switch is connected.

At this point, switch connection for address phase is established, and a transaction of the address phase or a transaction of a phase other than data is possible.

After a master checks that y_srdyp to be inputted to the master is issued and a transaction canceled y_tsp, the transaction is begun.

The switch performs bus arbitration of next transaction in the following cycle in which y_tsp is canceled.

Switch connection for a data phase is established after switch connection for an address phase is established. Concretely, switch connection for a data phase is established in the following cycle in which switch connection for an address phase is established.

An address phase is cycles in which y_tsp and y_srdyp are issued. That is, an address phase is two cycles from a cycle, in which switch connection for the address phase is established, to the next cycle, and a data phase is two cycles shifted by one cycle from an address phase.

Hereinafter, protocols for transactions will be explained. As types of transactions, there are transactions of 128-bit single beat and two beats for both read transaction and write transaction.

In the case of single beat, valid beat is a first one beat, however two beats are fixed in a data phase. Switching of transfer of single beat and two beats is performed by issuing y_one_not_two to be issued by a master.

Access of 128 bits or less is performed with single transaction, and access bytes are controlled by byte enable signal corresponding to each write and read. Not depending on transaction size, data position for address is fixed. In the case of two-beat transaction, all byte enable is valid and access is performed.

In addition, alignment of address must be accessed according to line.

(1) Write Transaction

Figure 1:
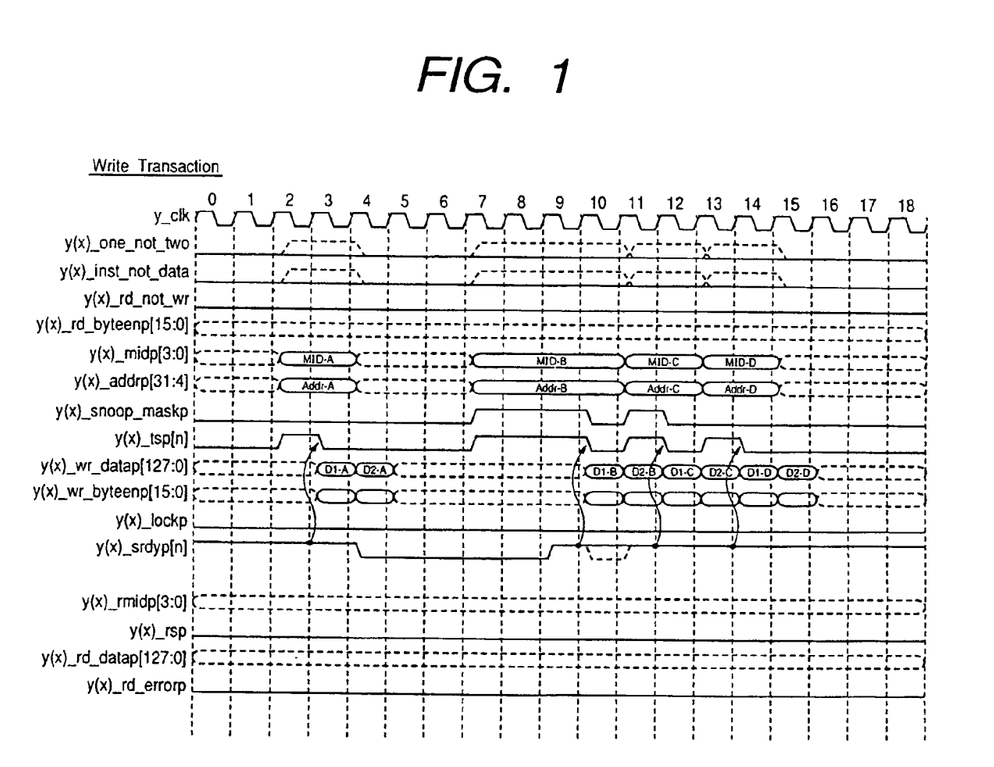
FIG. 1 is a figure to show a bus protocol when write transaction is performed.

Hereinafter, protocols for write transaction will be explained. FIG. 1 shows bus protocols if write transaction is performed. Cycle numbers in the following description corresponds to ones shown in FIG. 1.

Cycle 2:

When beginning a transaction, a master issues y_tsp to a corresponding to slave. Simultaneously, the master must confirm and issue y_one_not_two, y_rd_not_wr, y_inst_not_ data, y_addrp and y_midp.

Cycle 3:

Since y_srdyp of the slave, which performs access, is issued, switch of an address phase is established in the cycle 2 and then the address phase is begun. Subsequently, the master cancels y_tsp. The signals of y_one_not_two, y_rd_not_wr, y_inst_not_data, y_addrp and y_midp must be maintained as they are. The address phase is established in cycle 2, so that switch of a data phase is established in this cycle after one cycle. The master issues y_wr_datap and y_wr_byteenp in the first beat.

Cycle 4:

Since the transaction of the address phase is completed, switch connection of the address phase is released, and the issue of y_one_not_two, y_rd_not_wr, y_inst_not_data, y_addrp and y_midp is canceled. In addition, the master issues y_wr_datap and y_wr_byteenp in the second beat. If the transaction is performed in the state of issuing y_one_not_two, y_wr_datap and y_wr_bytenp in this cycle are invalid.

Cycle 5:

The transaction of the data phase is completed, and switch connection of the data phase is released. At this point, this write transaction is completed.

Cycles 8 and 9:

For beginning next transaction, the master issues y_tsp a corresponding to slave, and then confirms y_one_not_two, y_rd_not_wr, y_inst_not_data, y_addrp and y_midp. In the slave side, y_srdyp is not issued and the slave is not in the receiving state, so that the master must continue to issue y_tsp.

Cycle 10:

In the cycle 9, since y_srdyp is issued and switch connection of an address phase is established, the transaction is begun.

Cycle 11:

Since switch connection of the address phase is released, if y_srdyp is issued, the master issues y_tsp of next transaction in this cycle and then begins the transaction.

Cycles 12 to 15:

If write transactions are continuously performed and the interval of them is narrow, the transactions can be begun without gaps.

(2) Read Transaction

Figure 2:
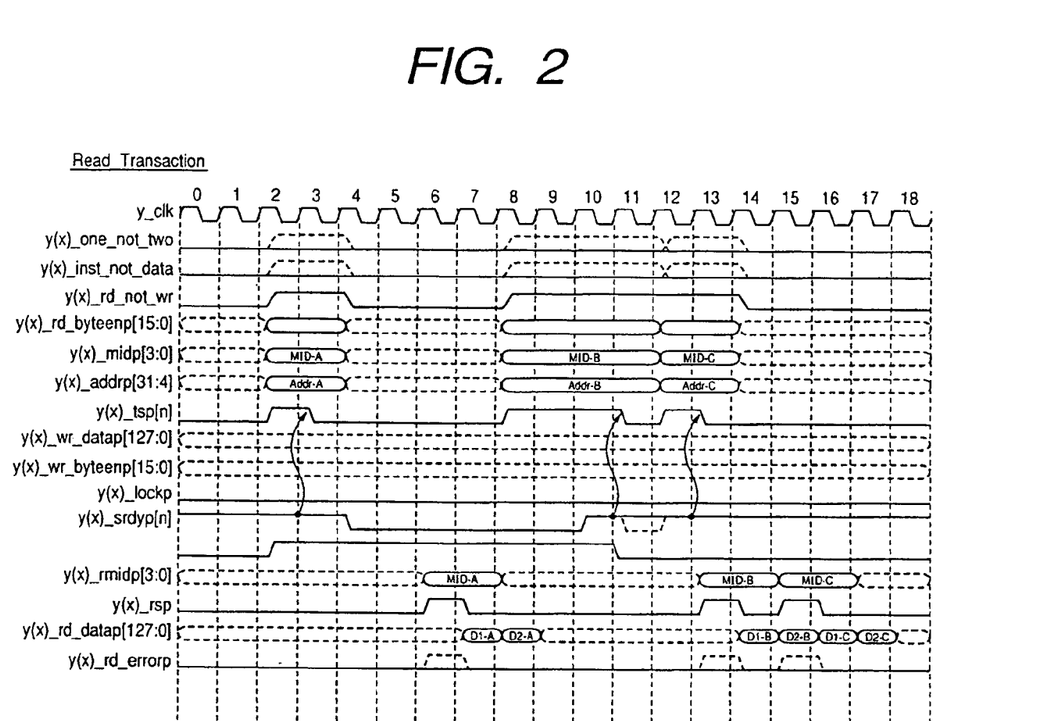
FIG. 2 is a figure to show a bus protocol when read transaction is performed.

Hereinafter, protocols of read transaction will be explained. FIG. 2 shows bus protocols if read transaction is performed. Cycle numbers in the following description corresponds to ones shown in FIG. 2.

Cycle 2:

When beginning a transaction, a master issues y_tsp to a corresponding to slave. Simultaneously, the master must confirm and issue y_one_not_two, y_rd_not_wr, y_inst_not_ data, y_addrp, y_midp and y_rd_byteenp.

Cycle 3:

Since y_srdyp of the slave, which performs access, is issued, switch of an address phase is established in the cycle 2 and then the address phase is begun. Subsequently, the master cancels y_tsp. The signals of y_one_not_two, y_rd_not_wr, y_inst_not_data, y_addrp, y_midp and y_rd_byteenp must be maintained as they are. The address phase is established in cycle 2, so that switch of a data phase is established in this cycle after one cycle.

Cycle 4:

Since the transaction of the address phase is completed, switch connection of the address phase is released, and the issue of y_one_not_two, y_rd_not_wr, y_inst_not_data, y_addrp, y_midp and y_rd_byteenp is canceled. By performing the above-described cycles, the transaction of the read command issued by the master is completed.

Cycle 6:

If preparing read return data, the slave issues y_rsp and y_rmidp to begin a read return transaction. The signal y_rmidp is one issued by the master. If the read transaction is error, y_rd_errorp is issued.

Cycle 7:

The issue of y_rsp is canceled. In addition, if y_rd_errorp was issued, the issue of it is canceled. Read data in the first beat is issued to y_rd_datap.

Cycle 8:

The issue of y_rmidp is canceled, and read data in the second beat is issued to y_wr_datap. If the read transaction is one after y_one_not_two is issued, data in the second beat is invalid.

Cycle 9:

The read transaction is completed.

Cycles 9 and 10:

To begin next transaction, the master issues y_tsp to a corresponding to slave, and confirm y_one_not_two, y_rd_not_wr, y_inst_not_data, y_addrp and y_midp. Since y_srdyp is not issued, the slave side is not in the receiving state and the master must continue to issue y_tsp.

Cycle 11:

In the cycle 10, y_srdyp is issued and switch connection of an address phase is established, so that the transaction is begun.

Cycle 12:

Since switch connection of the address phase is released, if y_srdyp is issued, y_tsp of next transaction is issued in this cycle to begin the transaction. If read transactions are continuously performed and the interval of them is narrow, the transactions can be begun without gaps.

By using the above-described protocols, in the state that phases are separated into address phase and data phase, switch connection is changed and each switch connection is released. Therefore, accesses from a plurality of masters to the same slave, or from the same master to a plurality of slaves can be issued in parallel.

(3) Multi Master Transaction

Hereinafter, processing procedures for transactions from a plurality of masters to one slave will be explained using FIG. 3.

Figure 3:
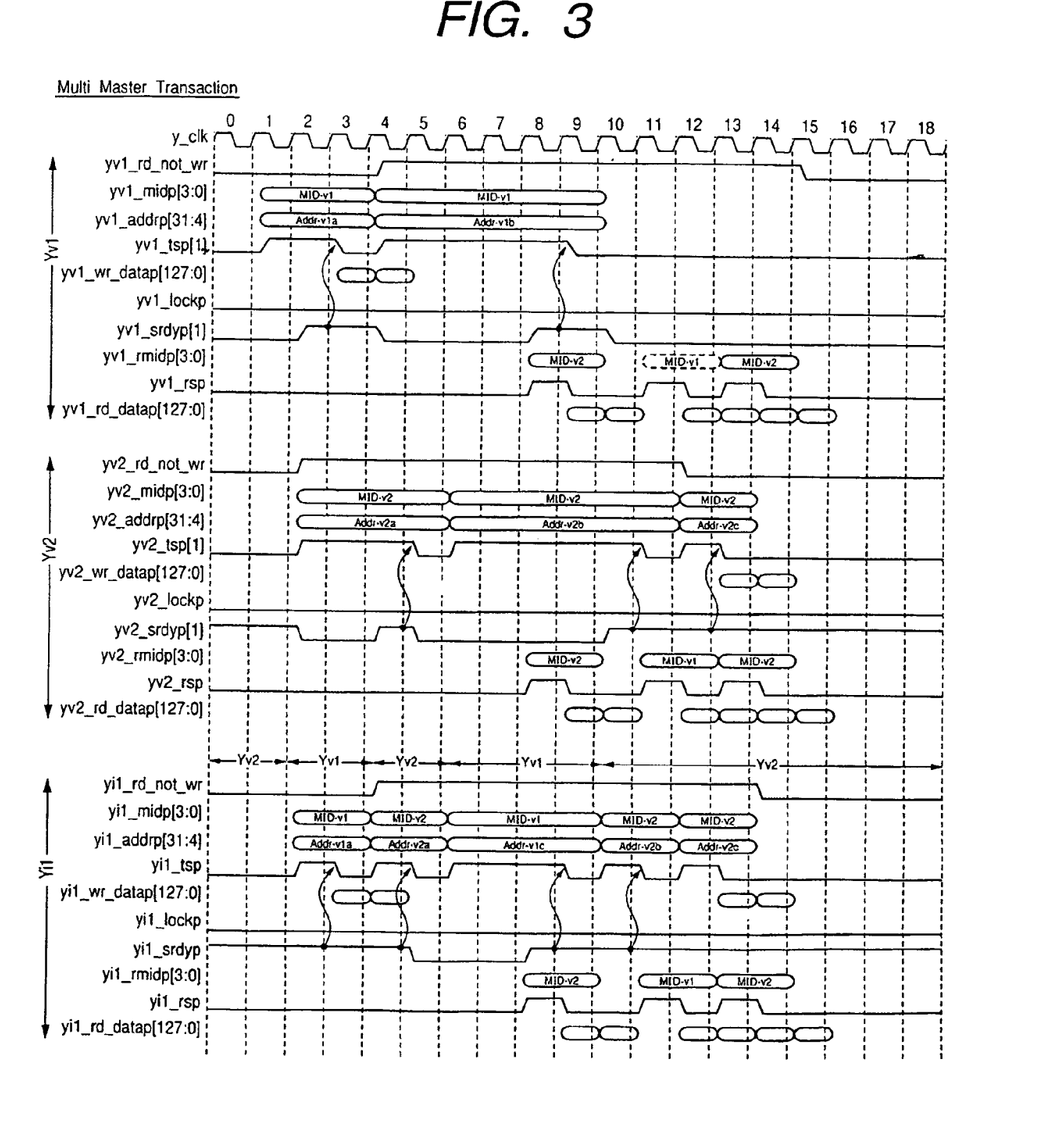
FIG. 3 is a figure to show a bus protocol when a transaction from a plurality of masters to a single slave is performed.

In FIG. 3, Yv is a bus in the master side and Yi is a bus in the slave side. In both sides, protocols are the same. The buses Yv and Yi are connected through the switch. Two masters shown in FIG. 3 issue y_tsp in the same cycle, however y_srdyp from the slave side is issued to only one master and switch connection is established.

When the address phase of a master, which performs access, is completed, the slave issues y_srdyp to another master, and then switch connection is established and the transaction is begun. At read return, the slave issues y_rmidp, and transfers data. In the master side, each master inputs the read return data, to which master ID that is assigned to the master is issued. Then, the read transaction is completed.

If the same master performs read transactions, the slave side must return read data in the access order.

(4) Multi Slave Access Transaction

Figure 4:
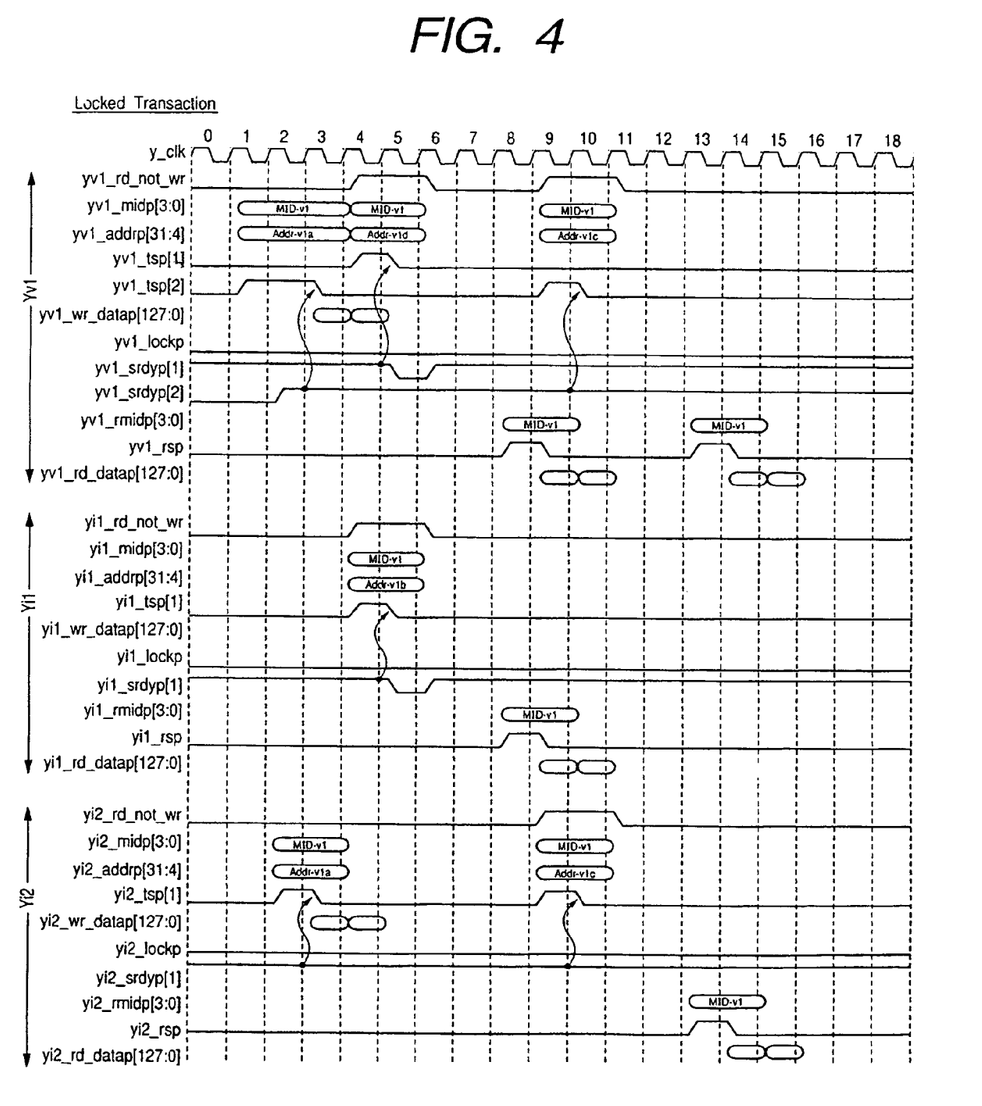
FIG. 4 is a figure to show a bus protocol when a transaction from a single master to a plurality of slaves is performed.

Hereinafter, processing procedures for transactions from one master to a plurality of slaves will be explained using FIG. 4.

By issuing y_tsp corresponding to slaves to be accessed, the mater selects slaves and then begins a transaction.

In the master side, the switch is released when the address phase is completed, so that the master can issue next transaction. That is, when the address phase of one transaction is completed, the master issues y_tsp to a slave to be accessed next and then begins next transaction.

(5) Locked Transaction

Figure 5:
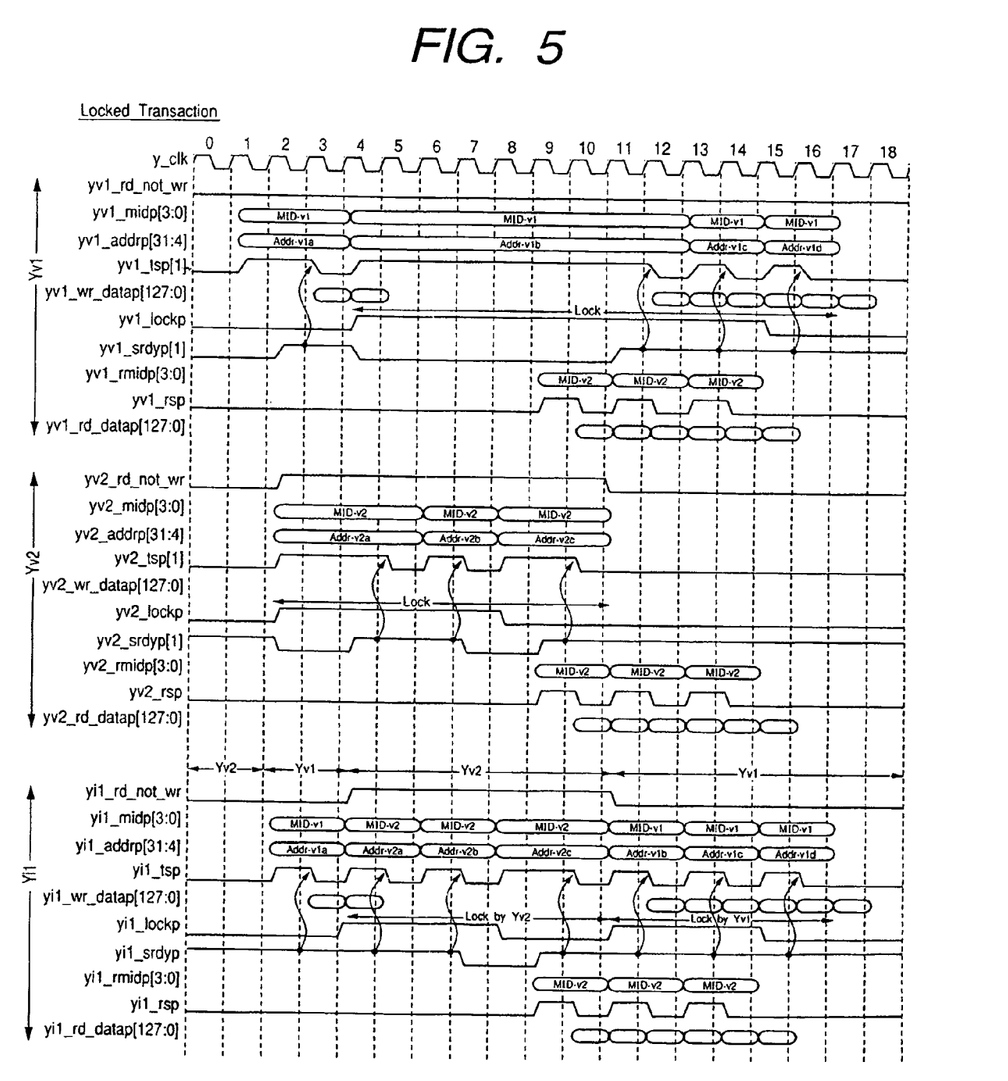
FIG. 5 is a figure to show a bus protocol when a master performs continuous transactions for the same slave.

Hereinafter, processing procedures for continuous transactions from a master to the same slave will be explained using FIG. 5.

If performing accesses continuously, a master issues y_lockp. If y_lockp is issued, an arbiter in the switch dose not release the switch even if the address phase is completed and maintains the state, in which switch connection is established. Therefore, if the slave is ready, the master can begin next transaction. If y_lockp is issued, the switch maintains connection until the issue is canceled. If performing continuous transactions, the master must access only the same slave while issuing y_lockp.

The switch connects a plurality of masters and a plurality of slaves, and provides a switch connection mechanism from masters to slaves and a transfer path of read return data.

The switch connection mechanism from masters to slaves includes a bus arbitration mechanism, and establishes switch connection after detecting y_tsp from a master and y_srdyp from a slave. As described in multi master transaction and multi slave transaction, arbitration of switch connection controls establishment of switch connection based on use situation of y_tsp issued by masters and y_srdyp issued by corresponding slaves.

When a plurality of masters request switch connection at the same time, masters, which are permitted connection, are selected by the arbitration mechanism and y_srdyp is issued to the masters.

According to the above-described embodiments, address phase and data phase can be overlapped. In addition, a read request is switched besides an access from a master, so that the master can begin a transaction for another slave before read return is received.

With this method, in a controller for a multi apparatus, which is connected with a plurality of masters and a plurality of slaves, transactions from a master to slaves or from masters to the same slave can be issued at the same time.

Therefore, when an access is performed to a slow device, a transaction to a high-speed device can be issued, so that whole processing performance is not lowered and a switching mechanism maintaining high bandwidth can be provided.

In addition, a single transaction and a burst transaction perform the same sequence, so that hardware control becomes simple.

Furthermore, by using a switch request signal as a transaction start signal, it is not necessary to receive the recognition signal to a request signal, so that response time for a switch request is shortened to improve performance.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A bus control method for a bus, which is provided with a switch having a plurality of master ports for connecting a plurality of masters and a plurality of slave ports for connecting a plurality of slaves, wherein the switch can establish connection paths between each of the plurality of masters and an arbitrary one of the plurality of slaves for transmitting and receiving a command, an address, and data via the switch, said method comprising:

a read command transaction step for issuing a first switch request from a first master to the switch for connecting with a first slave, establishing a first connection path between the first master and the first slave through the switch, issuing a first address and a first read command from the first master to the first slave via the first connection path, and releasing the first connection path before read return data corresponding to the first read command is issued from the first slave; and a read data transaction step for issuing a second switch request from the first slave to the switch for connecting with the first master if the read return data is ready after the first connection path is released in the read command transaction step, establishing a second connection path between the first slave and the first master via the switch independent from the first connection path established in the read command transaction step, and issuing the read return data from the first slave to the first master via the second connection path, wherein, before the read data transaction step is completed, a read command transaction step of a next read transaction can be initiated.

2. The bus control method according to claim 1, wherein a start signal for initiating the read transaction is used also as a request signal for the switch request for connecting with the slave.

3. A bus system comprising:
a plurality of masters;
a plurality of slaves; and
a bus that is provided with a switch,
wherein the switch can establish connection paths between each of the plurality of masters and an arbitrary one of the plurality of slaves for transmitting and receiving a command, an address, and data via the switch, in a read transaction which includes a read command transaction and a read data transaction, wherein, in the read command transaction, a first master issues a first switch request to the switch for connecting with a first slave, the switch establishes a first connection path between the first master and the first slave through the switch, the first master issues a first address and a first read command to the first slave via the first connection path, and the switch releases the first connection path before read return data corresponding to the first read command is issued from the first slave, wherein, in the read data transaction, the first slave issues a second switch request for connecting with the first master if the read return data is ready after the first connection path is released in the read command transaction, the switch establish a second connection path between the first slave and the first master through the switch independent from the first connection path established in the read command transaction, and the first slave issues the read return data to the first master via the second connection path, and wherein, before the read data transaction is completed, a read command transaction of a next read transaction can be initiated.

4. The bus control method according to claim 1, wherein a start signal for initiating data return in the read data transaction step is used also as a request signal for the switch request for connecting with the master.

5. The bus control method according to claim 1, wherein the next transaction is a transaction from another master to the slave.

6. The bus control method according to claim 1, wherein the next transaction is a transaction from the master to another slave.

7. The bus control method according to claim 1, wherein the master issues an identifier of the master with the address and the command to the slave in said read command transaction step, and the slave issues the identifier of the master with the read return data in said read data transaction step.

* * * * *